United States Patent
Lightner et al.

[11] Patent Number: 6,155,110
[45] Date of Patent: Dec. 5, 2000

[54] METHOD FOR PREDICTING TIRE PERFORMANCE ON RAIN GROOVE ROADWAYS

[75] Inventors: John G. Lightner, Hartville; Larry L. Schlabaugh, Cuyahoga Falls; David C. Christy, Akron; Karl J. Neimes, Brecksville; Martin A. Yurjevich, North Canton; John D. Clothiaux, Hudson, all of Ohio

[73] Assignee: Bridgestone/Firestone, Inc., Akron, Ohio

[21] Appl. No.: 08/847,449

[22] Filed: Apr. 24, 1997

[51] Int. Cl.[7] .......................... G01M 15/00; G01M 17/02
[52] U.S. Cl. ...................................... 73/146; 73/8
[58] Field of Search ................................. 73/8, 117, 146, 73/146.2, 146.3, 146.4, 146.5

[56] References Cited

U.S. PATENT DOCUMENTS

| | | | |
|---|---|---|---|
| 4,251,931 | 2/1981 | McKechnie | 73/146 |
| 4,455,866 | 6/1984 | Barrigar | 73/117 |
| 4,584,873 | 4/1986 | Ongaro | 73/146 |
| 4,593,557 | 6/1986 | Oblizajek et al. | 73/146 |
| 4,969,212 | 11/1990 | Walter | 364/424.03 |
| 5,092,166 | 3/1992 | Wada et al. | 73/146 |
| 5,289,718 | 3/1994 | Mousseau | 73/146 |
| 5,375,464 | 12/1994 | Dadt | 73/146 |
| 5,502,433 | 3/1996 | Breuer et al. | 73/146 |
| 5,705,746 | 1/1998 | Trost et al. | 73/146 |
| 5,723,768 | 3/1998 | Ammon | 73/146 |

FOREIGN PATENT DOCUMENTS

| | | |
|---|---|---|
| 0504699A2 | 9/1992 | European Pat. Off. . |
| 0578216A1 | 1/1994 | European Pat. Off. . |
| 0647911A2 | 4/1995 | European Pat. Off. . |

OTHER PUBLICATIONS

European Search Report of Application 98250143.9–2213, Oct. 6, 1999.

*Primary Examiner*—George Domborske
*Attorney, Agent, or Firm*—D. A. Thomas; John M. Vasuta

[57] ABSTRACT

A method of testing a tire for rain groove wander is provided which allows a tire to be objectively tested in a laboratory wherein the objective test results closely correlate with subjective field analysis type data, thereby allowing for the subjective tire performance to be predicted while precluding the need for subjective field analysis of the particular tire. The method also allows objective testing of a single tire size by varying the radial loading in the laboratory test set, thereby precluding the construction of multiple tire sizes each having the same tread design. The method simulates rain groove road conditions and correlates objective analysis data obtained via the laboratory test methodology with subjective field analysis data of rain groove wander tire performance of other tires, thereby providing a substantially accurate technique for identifying the subjective performance of the tire without having to conduct the field testing to obtain such subjective field analysis data. The method substantially reduces the cost required is to design and test a prototype tire design and the time required to implement tire design testing.

21 Claims, 14 Drawing Sheets

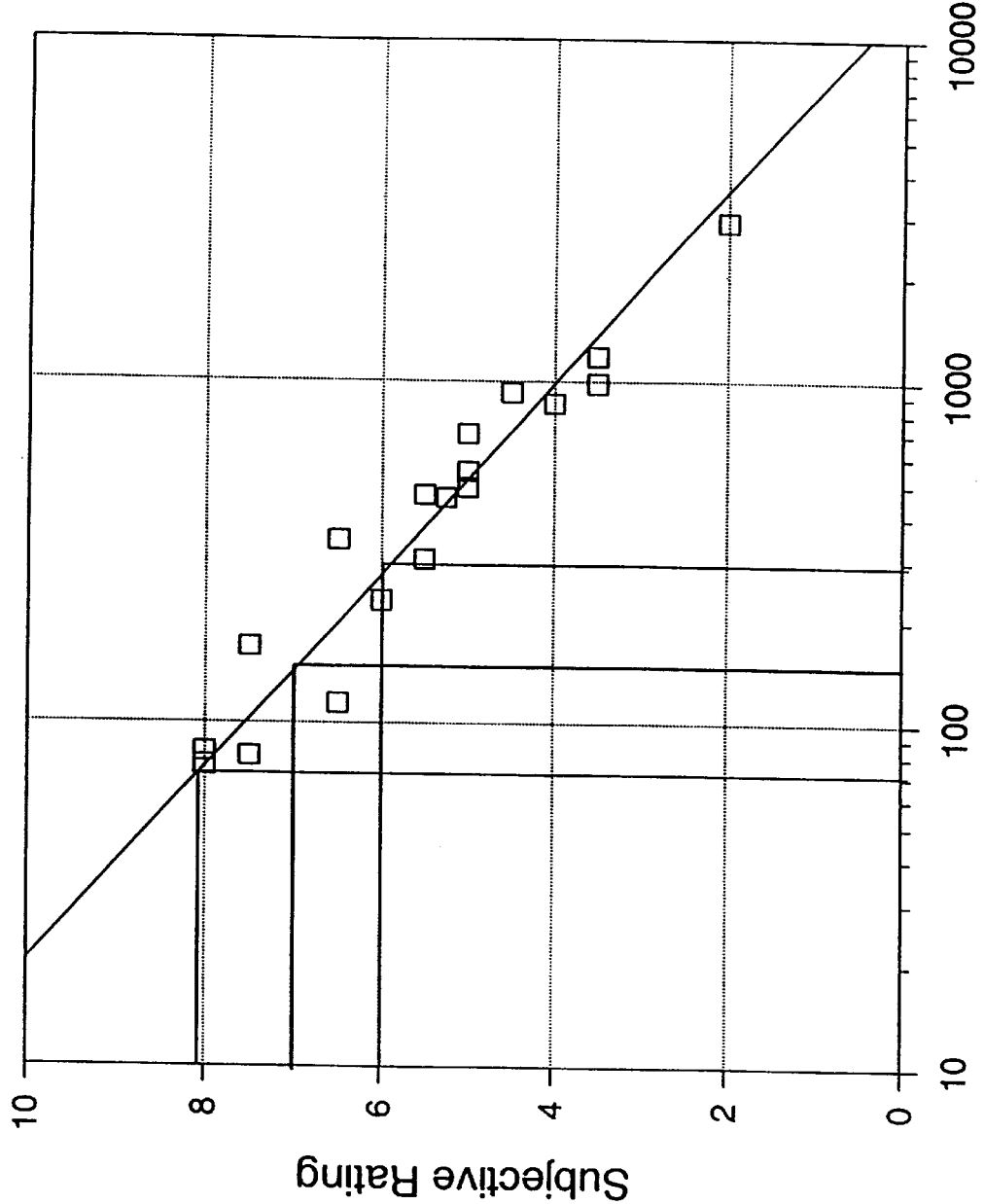

METHOD FOR PREDICTING TIRE PERFORMANCE ON RAIN GROOVE ROADWAYS

FIELD OF THE INVENTION

The present invention generally relates to test methods for evaluating tire performance. More particularly, the present invention is related to a method of testing a tire for rain groove wander and a method for correlating a subjective field analysis of rain groove wander for tires to an objective analysis technique that does not require vehicle testing to predict tire performance on rain groove roadways.

BACKGROUND OF THE INVENTION

Various construction methods have been developed to address the issue of water on public roadways. One common method of improving a vehicle's traction on wet pavement has been to place longitudinal grooves in the roadways. While the grooved roadways provide improved traction for vehicles, such grooves also result in a reduction in both the handling and the rideability of the vehicle. This is caused by interactive forces between the vehicle's tires and the road grooves and is generally more acute on smaller vehicles. Consequently, tire manufacturers have been motivated to provide tire models which mitigate or eliminate the reduction in handling and rideability of vehicles caused by the grooved roadways.

In the past, tire performance was evaluated subjectively by placing a set of tires on a test vehicle and performing field evaluations. In such field testing, the driver would operate the vehicle on the grooved roadway and provide a subjective rating regarding the vehicle's handling and rideability as the vehicle traveled along the grooved highway as well as translated across various lanes to simulate actual driving conditions. Such subjective evaluations are very valuable in that they provide actual data reflecting the tire performance that correlates closely with customer satisfaction. Such subjective field analysis, however, is both a timeconsuming and an expensive process. First, four vehicle tires must be provided for the subjective analysis in order to provide an accurate reflection of the driving performance of the tires on the vehicle. Therefore, when testing a prototype tire design, four such tires must be manufactured. In the early prototype design phase, to avoid the high expense of creating tire molds, individual tires are often hand carved to fashion the desired tire tread. Hence, creating four such tires takes a substantially long period of time and each may differ slightly, thereby resulting in erroneous test data. Second, in order to test a tire design over various vehicle models to accurately reflect the tire performance across variable radial loading, additional prototype tires of other sizes must also be provided so that the tires may be effectively field tested for rain groove wander. Therefore, multiple tires are needed to appropriately field test each prototype tire design, thereby further increasing the development time and cost of the tire. Finally, there is an overhead cost involved with the shipping and handling of tires and tire disposal.

SUMMARY OF THE INVENTION

A method of testing a tire for rain groove wander is provided which allows a tire to be objectively tested in a laboratory wherein the objective test results closely correlate with subjective field analysis type data, thereby allowing for the subjective tire performance to be predicted while precluding the need for subjective field analysis of the particular tire. The method also allows objective testing of a single tire size by varying the radial loading in the laboratory test set, thereby precluding the construction of multiple tire sizes each having the same tread design. The method simulates rain groove road conditions and correlates objective analysis data obtained via the laboratory test methodology with subjective field analysis data of rain groove wander tire performance of other tires, thereby providing a substantially accurate technique for identifying the subjective performance of the tire without having to conduct the field testing to obtain such subjective field analysis data. The method substantially reduces the cost required to design and test a prototype tire design and the time required to implement tire design testing.

According to one aspect of the invention, a method of predicting tire performance on rain groove roadways by testing a tire includes simulating a rain groove road condition and measuring one or more forces acting on a tire which is operating on the simulated road condition. The one or more measured forces are then correlated to subjective tire performance data and the subjective tire performance is predicted based on the correlation, thereby effectively testing the rain groove wander performance of the tire without having to perform field testing. The step of simulating the rain groove road conditions may include placing the tire in rotatable contact with a grooved surface and moving the grooved surface such that the tire rotates and remains in contact with the grooved surface, thereby simulating the tire traveling on a rain groove roadway.

The method of testing a tire for rain groove wander may further include applying a variable radial loading on the tire to simulate the tire performance when used by various vehicle types. The method may also include translating the tire axially across the moving grooved surface to thereby simulate a lateral vehicle movement on a rain groove roadway.

The step of measuring the one or more forces acting on the tire under the simulated rain groove road conditions includes measuring a lateral force acting on the tire which is stored as data. The data is processed to place the processed data in a format that correlates substantially closely with the subjective field analysis tire performance data. One option of data processing may include time filtering the data, wherein the data within each of a plurality of prescribed time periods are averaged and compressing the data such that each piece of data associated with a particular lateral position of the tire with respect to a groove of the grooved surface is graphically overlaid. The compressed data is then normalized with respect to a mean lateral force measured across the grooved surface and a peak-to-peak force difference of the normalized data is calculated for use in correlating the measured forces to the subjective field analysis tire performance data. Alternatively, after normalizing the compressed data with respect to a mean lateral force across the grooved surface, a predetermined number of Fourier coefficients may be extracted from the normalized compressed data and the Fourier coefficients are subsequently squared and summed together for use in correlating the measured forces to the subjective tire performance data.

In another aspect of the invention, a method for correlating a subjective field analysis of rain groove wander for tires to an objective laboratory analysis technique that does not require vehicle testing includes collecting subjective field measurements of rain groove wander for a particular tire. During such field testing, objective field measurements of one or more forces acting on the tire are concurrently collected with the collection of the subjective field measurements and the subjective and objective field measurements are correlated. Objective lab measurements of one or more forces acting on the tire under simulated rain groove roadway conditions are collected and a correlation between the objective field measurement data and the objective lab measurement data is identified, thereby effectively correlating the objective lab measurement data to the subjective field measurement data.

The step of collecting subjective field measurements includes driving a vehicle having a set of tires for evaluation on a rain groove roadway and providing a subjective rating during the driving, wherein the subjective rating reflects a composite handling and rideability characteristic of the vehicle sensed by a driver of the vehicle. Further, the step of collecting objective field measurements includes driving the vehicle having a set of tires for evaluation on the rain groove roadway and measuring one or more forces exerted by the grooves on the rain groove roadway on the tires. Further still, the step of collecting objective lab measurements of forces acting on the tire under simulated rain groove roadway conditions includes simulating the rain groove road conditions, measuring one or more forces acting on the tire which is operating in the simulated rain groove road conditions, and processing the data for subsequent correlation of the processed data to the subjective tire performance analysis data.

In another aspect of the invention, a method of selecting a desired tire based on a desired subjective rain groove roadway characteristic without performing a subjective field tire evaluation includes selecting a desired subjective rain groove roadway tire performance characteristic. An objective force value that correlates with the desired subjective rain groove roadway tire performance characteristic is identified and a simulated force characteristic based on the identified objective force is identified. One or more tires are then simulated and the tire that meets the required simulated force characteristic is selected, thereby selecting the tire having the desired subjective rain groove roadway tire performance characteristic.

The foregoing and other features of the invention are hereinafter fully described and particularly pointed out in the claims. The following description and the annexed drawings set forth in detail one or more illustrative embodiments of the invention, each being indicative, however, of but one of the various ways in which the principles of the invention may be employed.

BRIEF DESCRIPTION OF THE DRAWINGS

FIGS. 10A–10C are graphs which illustrate a manner in which one may identify whether a particular tire will provide sufficient subjective performance by evaluating the objective laboratory test data of the particular tire.

DETAILED DESCRIPTION OF THE INVENTION

A method for testing a tire for rain groove wander includes a subjective field testing of a vehicle utilizing various sets of tires for subjective analysis testing on a rain groove roadway. In the subjective field analysis, a driver, while driving the vehicle on the rain groove roadway, provides a subjective analysis of the handling and rideability of the vehicle caused by the interaction between the tires and the rain groove roadway. Concurrently with the subjective field analysis, an objective field analysis is also taking place wherein a force measurement apparatus (for example, a load cell) is attached to one or more of the vehicle spindles during field testing of the tires. The force measurement apparatus measures one or more forces acting on the tires and may be operable to record the three orthogonal forces as well as the three moment forces that fully define the range of motion of the tire with respect to the rain groove roadway. In this particular embodiment, the force measurement apparatus measures at least the lateral force exerted by the rain groove roadway upon the tires. The data is then collected and processed to correlate with the collected subjective field analysis data. Therefore, the field analysis results in a collection of the subjective field data as well as a concurrent set of objective field analysis data for various sets of tires at a single radial loading. Once obtained, additional field analysis is not needed and tire performance on rain groove roadways may be predicted based on objective lab testing.

Objective lab testing is conducted using a laboratory test set apparatus (which will be subsequently described in greater detail) which preferably records the lateral forces exerted on the tires that were tested in the field testing by the test set which simulates rain groove roadway conditions. In this manner, objective laboratory analysis data is collected for each tire in which correlation between the various pieces of lab and the collected field data may be explored. The present invention contemplates processing one or more pieces of data in order to establish a substantially close correlation between the objective laboratory data and the subjective field analysis data to thereby predict a tire's subjective performance via tire testing within the laboratory and thereby preclude further subjective field analysis which is both costly and time consuming.

Figure 1A:
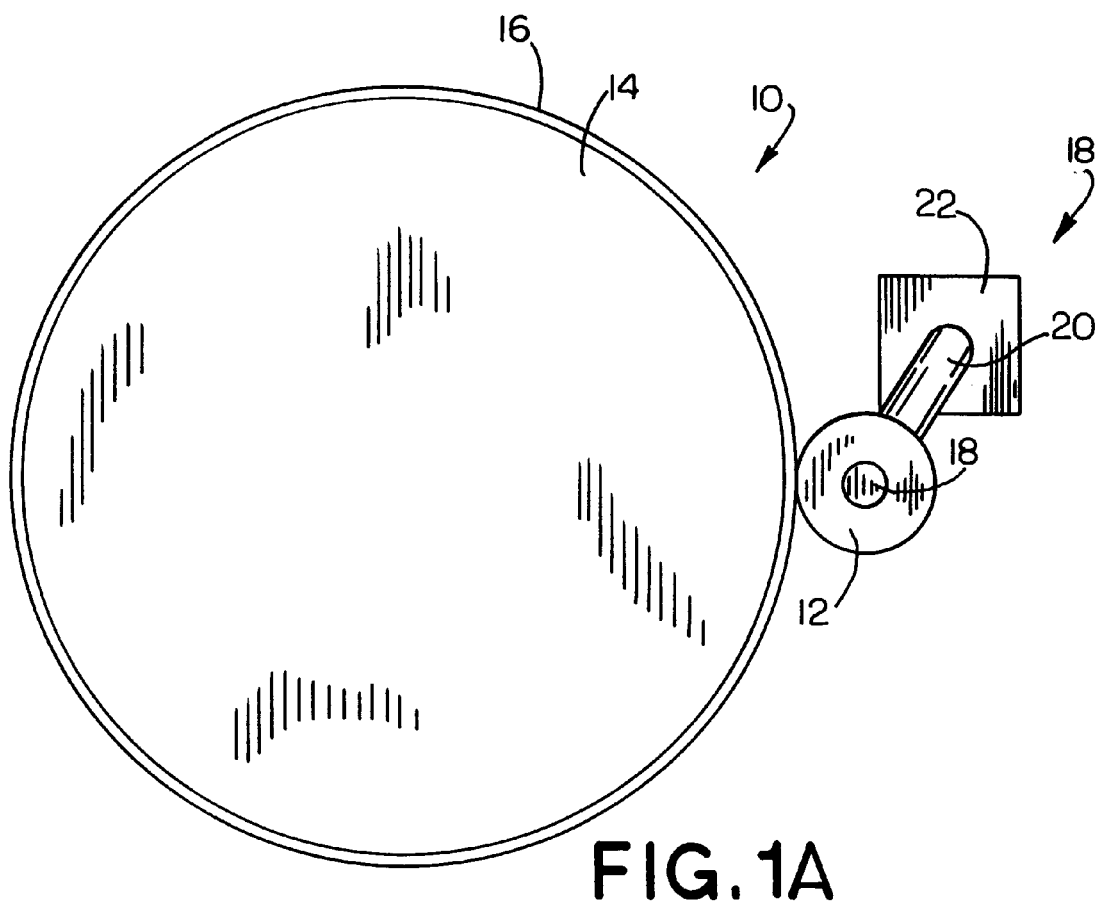
FIG. 1A is a schematic diagram illustrating a laboratory test set apparatus for testing a tire under simulated rain groove roadway conditions.

FIG. 1A is a system level schematic diagram which illustrates a laboratory test set 10, in which a tire 12 is tested under simulated rain groove roadway conditions. The laboratory test set 10 includes a cylindrical drum 14 having a substantially larger diameter than the diameter of the tire 12 to preferably simulate a substantially flat road condition as would be experienced in normal vehicle field testing. In this particular embodiment, the cylindrical drum 14 is approximately ten feet in diameter and is surrounded by an aluminum collar 16 which is approximately three-eighths inch thick. The aluminum collar 16 has grooves formed on its surface to simulate the rain groove roadway which are machined having 0.1 inch grooves on three-quarter inch centers. Alternatively, the grooves formed within the collar 16 may have different widths and different centering spacings to simulate other type roadway conditions. In another alternative embodiment, the collar 16 may be machined or scratched having uneven or nonperiodic movements in order to facilitate simulation of the uneven or nonperiodic character of the grooves within actual rain grooved roadways.

Figure 1B:
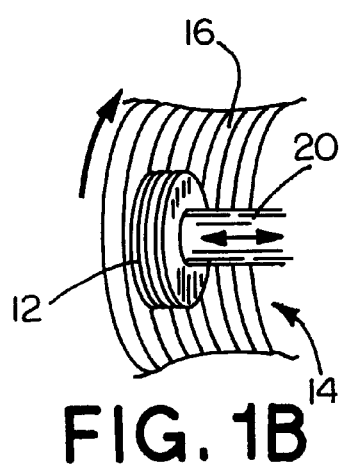
FIG. 1B is a perspective schematic view illustrating the translation of a tested tire across the simulated rain groove roadway.

A tire test set 18 places the tire 12 in rotatable contact with the cylindrical drum 14 and aluminum collar 16 via a rim 18 (containing a load cell) attached to an axle 20 which is controlled by a test control and data collection module 22. The test control and data collection module 22 is operable to provide various test characteristics such as the radial loading placed upon the tire 12 to simulate various vehicle weights that the tire may experience. The module 22 is also operable to vary the slip of the tire 12 with respect to the drum 14 and collar 16 to further simulate the impact of misaligned tires with respect to the simulated grooved roadway. In this particular embodiment, a zero degree slip is utilized, however, the slip may be modified to gather further data. The module 22 is also operable to translate the tire laterally (axially) across the simulated rain groove roadway (drum 14 and collar 16) in order to simulate a vehicle changing lanes in order for the various forces within the grooved roadway to act upon the tires. In addition, the module 22 also collects data with respect to the forces acting upon the tire due to the simulated roadway conditions via the load cell located on the rim 18. In this particular embodiment, the translation speed is such that a tire tread passes over a groove on the collar 16 every fourteen seconds and the data (representing at least the lateral force exerted on the tire 12) is collected at a sampling rate of 50 Hz. The speed experienced by the tire 12 may be modified or varied by altering the rotational speed of the cylindrical drum 14 to simulate varying speeds or vehicle acceleration or deceleration. FIG. 1B illustrates the translational functionality of the tire 12 across the collar 16 and the drum 14 via the axle 20.

Figure 2:
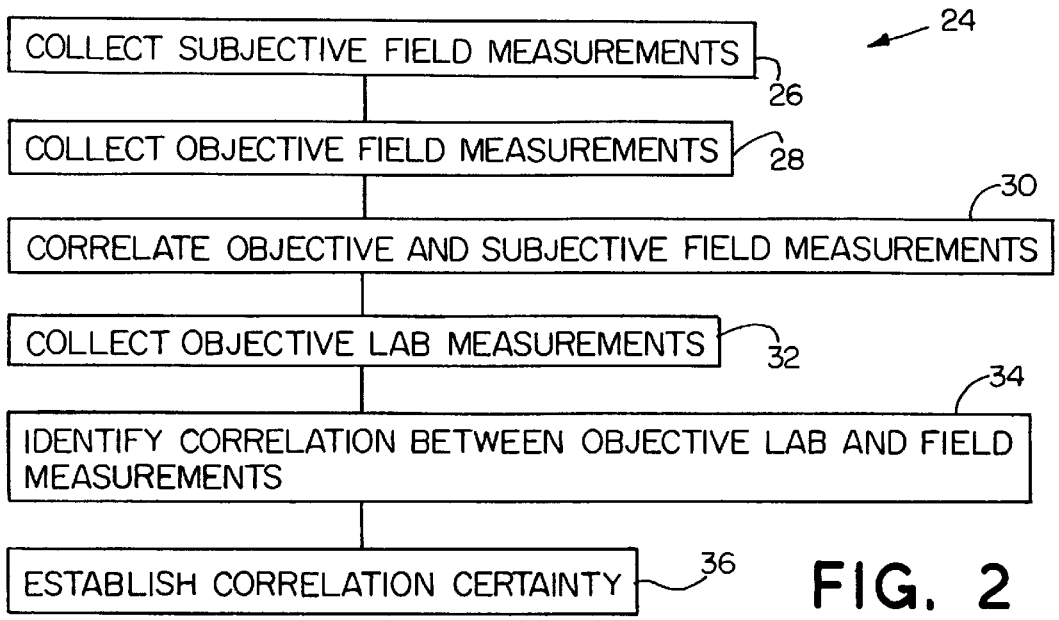
FIG. 2 is a block diagram illustrating the steps taken in the collection of subjective field measurements, objective field measurements and objective laboratory measurements to effectuate a correlation between the subjective field performance characteristics and the objective laboratory analysis data.
Figure 3A:
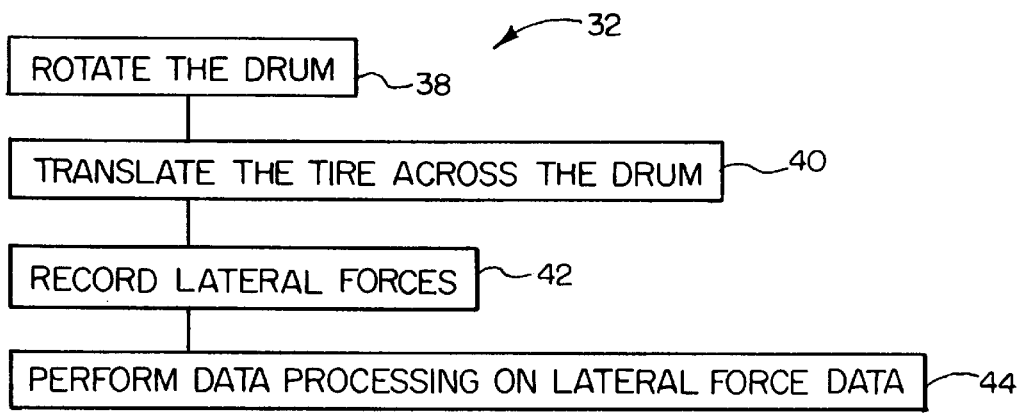
FIG. 3A is a block diagram illustrating the steps involved in collecting the objective laboratory analysis data.
Figure 3B:
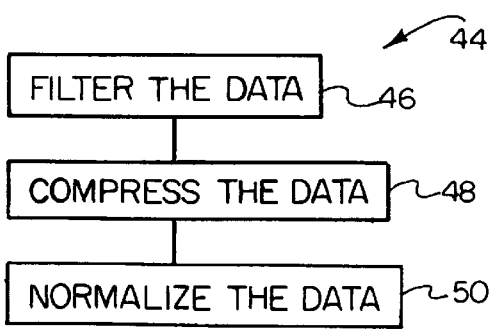
FIG. 3B is a block diagram illustrating the steps performed in processing the collected objective laboratory analysis data.

The steps in which the data is collected and subsequently processed may be further explained in detail with respect to FIGS. 2, 3A and 3B. FIG. 2 is a block diagram 24 which illustrates the various steps (26–36) taken to create a correlation-type methodology between the collected subjective field measurements representing a variety of tires and the collected laboratory measurements of a particular tire under test. FIG. 3A is a block diagram illustrating the various steps in the objective lab data collection method of step 32, and FIG. 3B is a block diagram which illustrates the various steps (46–50) in the data processing step 44 within the objective lab data collection methodology 32 of FIG. 3A. It should be noted that once the correlation step 30 has been performed and a sufficiently accurate correlation methodology has been identified, the correlation step 30 (and preceding steps) may be discontinued and subsequently all subsequent tire testing may take place via the objective data collection method 32, thereby precluding further testing via field analysis which is both costly and time consuming.

In the objective lab data collection step 32 of FIG. 3A, the cylindrical drum 14 and collar 16 are rotated at step 38 and the tire 12 is translated across the surface of the collar 16 at step 40 via the test control and data collection module 22. During the translation process, lateral forces are recorded by the test control and data collection module 22 via the load cell which represent the lateral forces exerted by the simulated rain groove roadway on the tires 12. In this particular embodiment, the lateral forces are measured, however, alternatively the test control and data collection module 22 may also record various other forces which are exerted upon the tire 12 for further analysis or correlation. Once the translation step 40 is complete, and the forces exerted on the tire 12 have been recorded at step 42, a data processing step 44 is performed on the collected data. The data processing step 44 is directed primarily at placing the data in a format that correlates substantially closely with the subjective field performance data. One example of a data processing methodology is illustrated by FIG. 3B and further illustrated in the accompanying graphs of FIGS. 4A–4C, 5, 6A, 6B and 7. However, other data processing methods are also contemplated by the present invention.

Figure 4A:
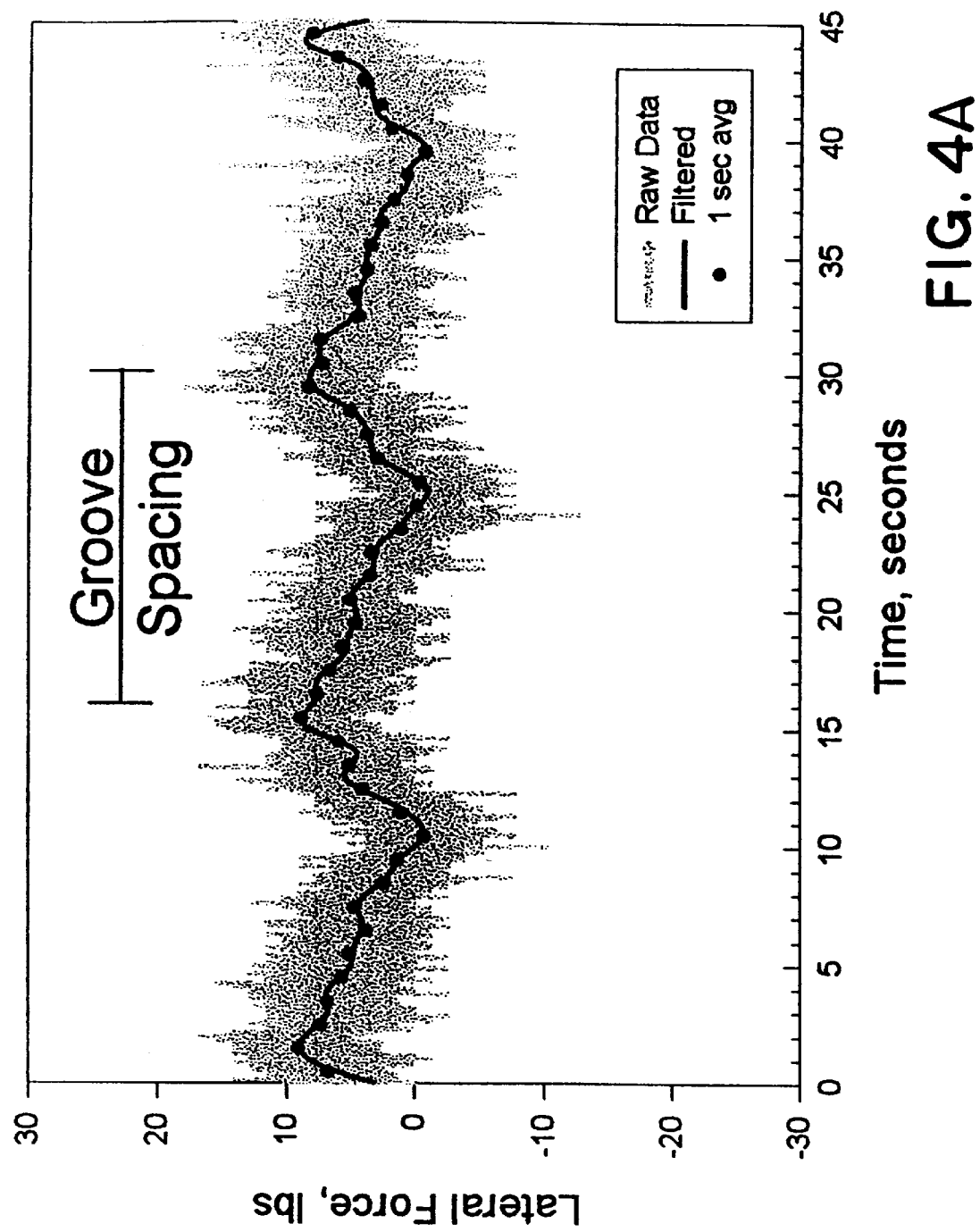
FIG. 4A is a graph illustrating the measured lateral force over time and the time filtering step in the processing of the collected data.

FIG. 3B is a block diagram illustrating various steps taken in the data processing method 44. Although various data processing steps may be undertaken, an exemplary embodiment involves the following. First, the collected lab data is filtered at step 46 and subsequently compressed at step 48 and normalized at step 50. The result of the filtering step 46 is illustrated in FIG. 4A which illustrates the recorded lateral force in pounds with respect to the time in which the test was conducted. In this particular embodiment, lateral force measurements were recorded at a sampling rate of 50 Hz while the tire 12 was translated laterally across the drum 14 at a speed at which a tire tread would pass over a groove every fourteen seconds. Furthermore, the data within FIG. 4A was collected at one particular radial loading value. The collected data is then filtered by time averaging the data every second. This is graphically represented by the data points connected by a line for clarity in FIG. 4A. Note that the lateral force data is periodic with respect to the groove spacing which repeats every fourteen seconds. This reflects that the lateral forces exerted by the simulated rain groove roadway on the tire 12 is a strong function of the position of the grooves with respect to the treads of the particular tire under test. FIG. 4A illustrates one particular data filtering method 46. Other types of filtering may be performed as desired.

Figure 4B:
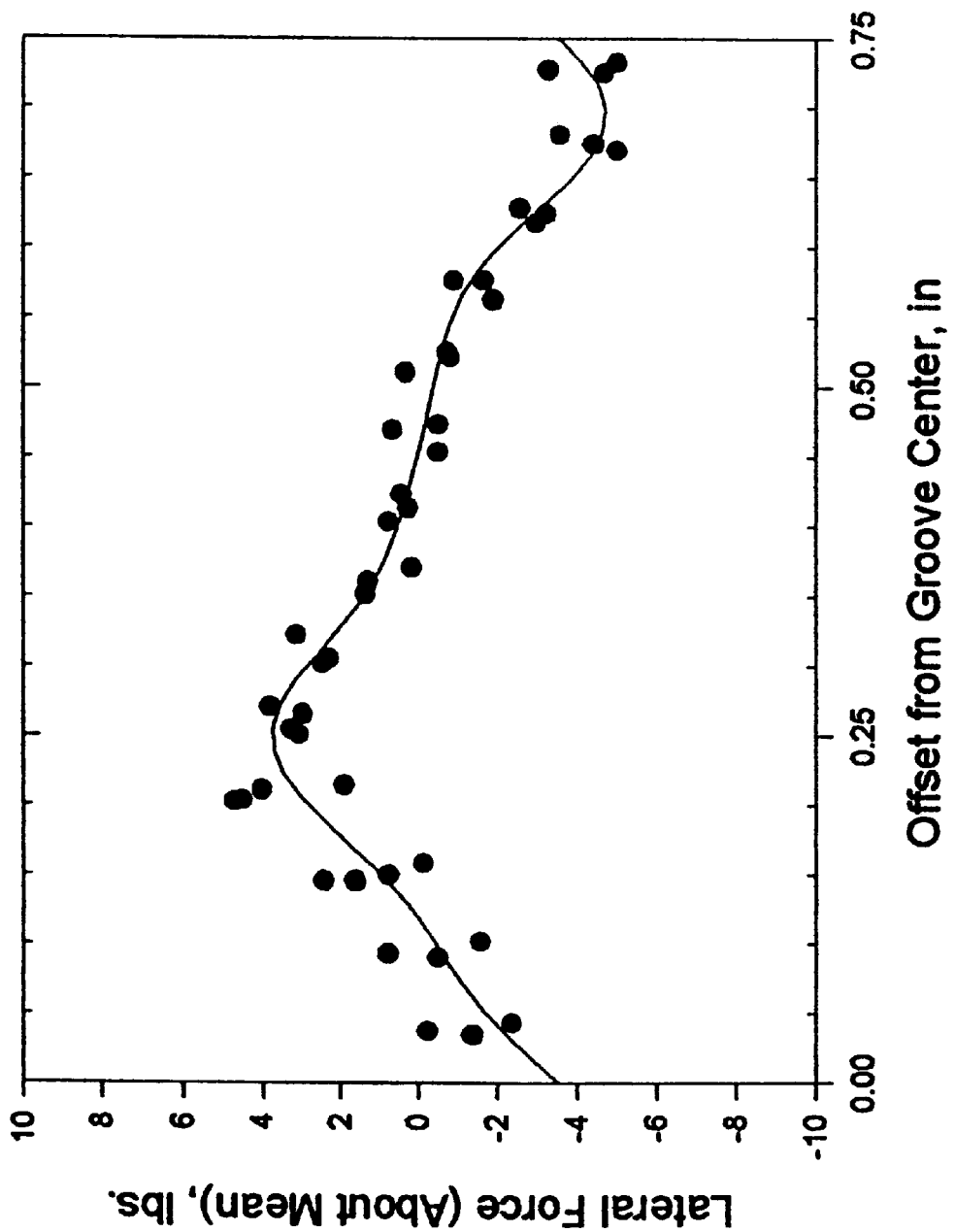
FIG. 4B is a graph illustrating the compressed filtered data wherein the time filtered lateral forces are graphed with respect to the position of the tire with respect to a groove in the simulated rain groove roadway (an offset from a groove center) and also illustrates the data normalization about a measured mean lateral force.

Data compression may then be performed via the data compressing step 48, the result of which is illustrated in FIG. 4B. In this data compression method 48, the lateral forces exerted on the tire for each one groove spacing are overlaid since, as illustrated in FIG. 4A, the lateral force distribution is substantially periodic in nature. Therefore, either all or a portion of the time filtered data from FIG. 4A may be graphically viewed over one groove spacing range and thereby compressed as illustrated in FIG. 4B.

Figure 4C:
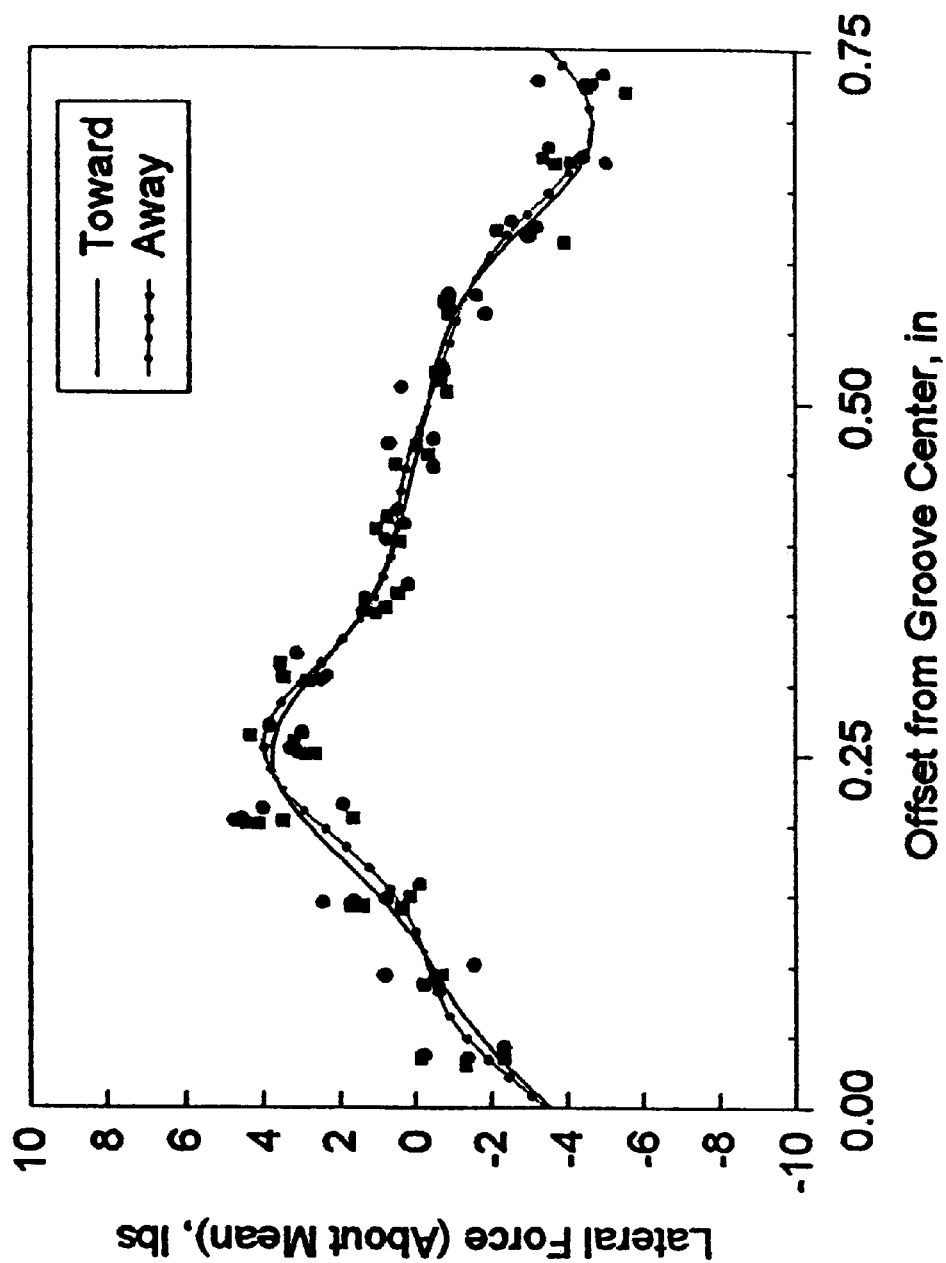
FIG. 4C is a graph illustrating how the data collected under the simulated road conditions is substantially the same with respect to the translation direction of the tire across the simulated roadway.

FIG. 4B also illustrates a normalization of the data (step 50 of FIG. 3B) about the mean lateral force in order for simplification of subsequent data processing. Alternatively, the data may be maintained in its unnormalized state. FIG. 4C is a graph illustrating the normalized, compressed lateral force data taken from translation directions both toward and away from the test control and data collection module 22. FIG. 4C illustrates that the lateral forces exerted on the tire 12 by the simulated rain groove roadway are substantially identical in either translation direction. Therefore, test data may be taken in either direction or both directions as desired. Preferably, the data is taken in one direction in order to shorten the test time for the lab data collection. Alternatively, one may wish to record the data in both translation directions and compare that data in order to confirm that there are no anomalies in the lab test apparatus 10 to thereby provide redundancy and improved accuracy in the laboratory data collection process.

Further data processing may then take place as desired in order to identify a substantially close correlation between the collected laboratory data and the subjective field performance data.

Figure 5:
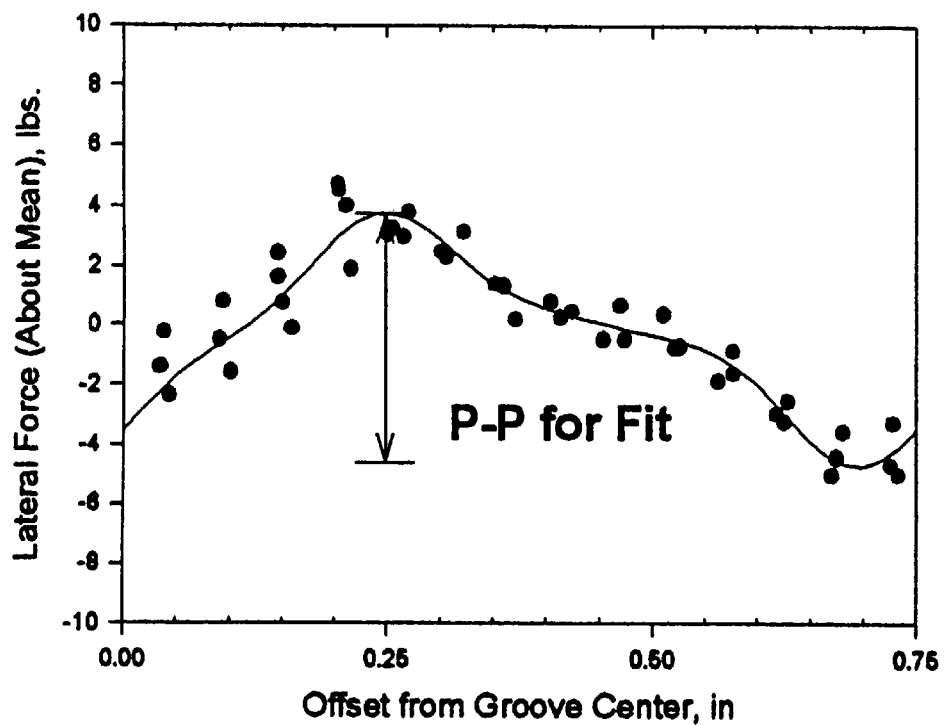
FIG. 5 is a graph illustrating the normalized lateral force with respect to the offset from the groove center wherein a peak-to-peak force value is calculated from the graph.
Figure 7:
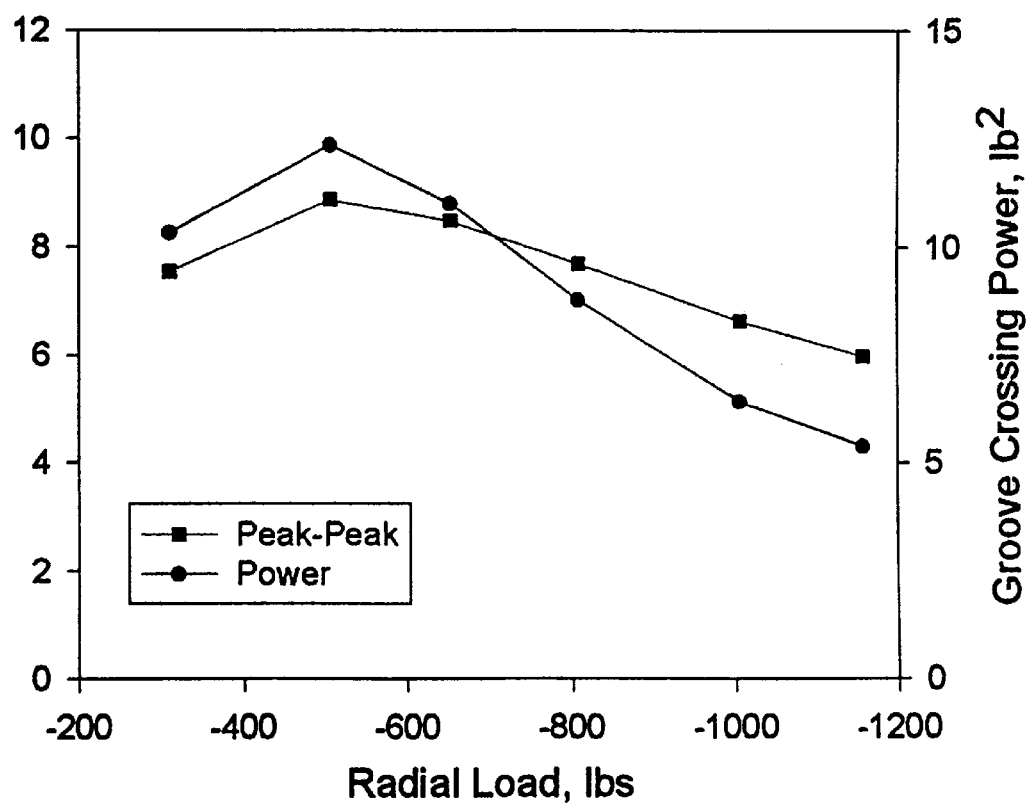
FIG. 7 is a graph illustrating both the average peak-to-peak measurement with respect to radial loading as well as the groove crossing power with respect to the radial loading.

FIGS. 5 and 7 are graphs which illustrate the result of one exemplary data processing methodology which takes the time filtered, compressed and normalized data of FIGS. 4A and 4B and utilizes that data to calculate a peak-to-peak lateral force value along the groove spacing. For example, in FIG. 5 the peak-to-peak lateral force value is calculated as approximately 8.5 lbs. for a particular tire at a particular radial loading. Various peak-to-peak values are calculated as the radial loading for a particular tire is varied. Note that collecting objective lab data at various radial loadings is straightforward since the test set 18 is operable to vary the radial loading on the tire 12. FIG. 7 is a graph which illustrates the averaging of the peak-to-peak lateral force values at each radial load value in which the various tires are averaged together to form a composite peak-to-peak characteristic over radial loading. This composite radial loading may then be utilized as a correlation curve in correlating the objective lab test data to the subjective tire performance data.

Figure 6A:
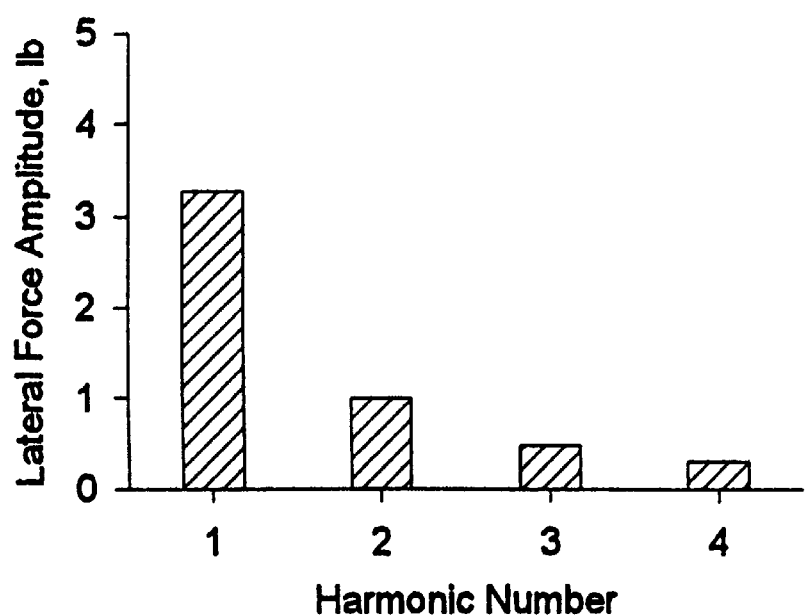
FIG. 6A is a graph illustrating the lateral force amplitude of extracted Fourier coefficients from the normalized data of FIG. 4B.
Figure 6B:
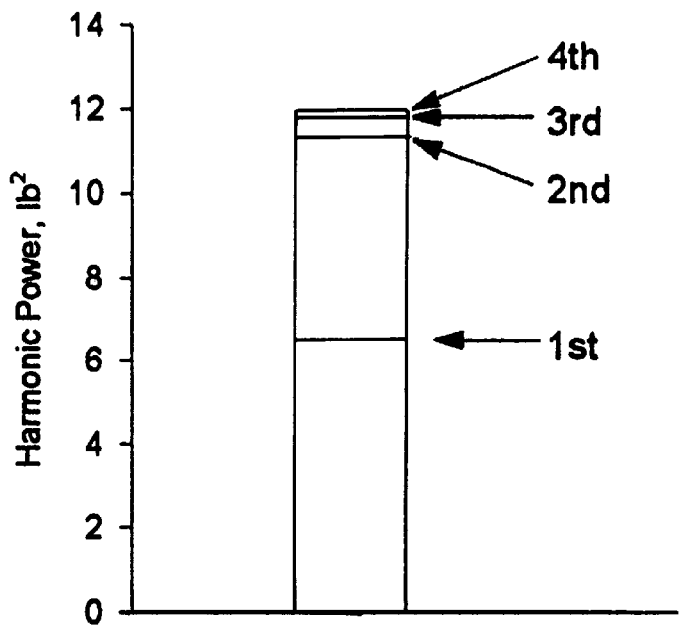
FIG. 6B is a graph illustrating the summation of the various harmonic Fourier coefficients squared.

FIG. 6A illustrates the results of an alternative data processing methodology in which the time filtered, compressed and normalized lateral force data of FIGS. 4A and 4B is processed by extracting Fourier coefficients. Fourier coefficients may be extracted via conventional signal processing techniques. FIG. 6A represents the lateral force amplitude for various Fourier coefficients according to their harmonic number. One may choose the resolution of the number of harmonic coefficients for extraction. In this exemplary embodiment, the number of coefficients was chosen to be four since four coefficients appear to provide sufficient resolution for subsequent correlation to the subjective field tire performance data. Alternatively however, if fewer Fourier coefficients may be extracted to provide sufficient correlation one may do so, and further, one may also choose additional Fourier coefficients in order to more closely or more accurately provide correlation to the subjective field tire performance data. Therefore, the required certainty of correlation or signal processing power available may dictate the number of Fourier coefficients extracted in the signal processing. FIG. 6B graphically illustrates a subsequent mathematical operation performed on the extracted Fourier coefficients of FIG. 6A by squaring the amplitudes of each coefficient and summing those amplitudes together to provide a harmonic power ($lb^2$) which is categorized and subsequently defined in this present invention as the groove crossing power. FIG. 7 illustrates the groove crossing power with respect to radial loading in order to provide a correlation between groove crossing power (representing the objective lab test data) and the subjective field tire performance data.

Figure 8A:
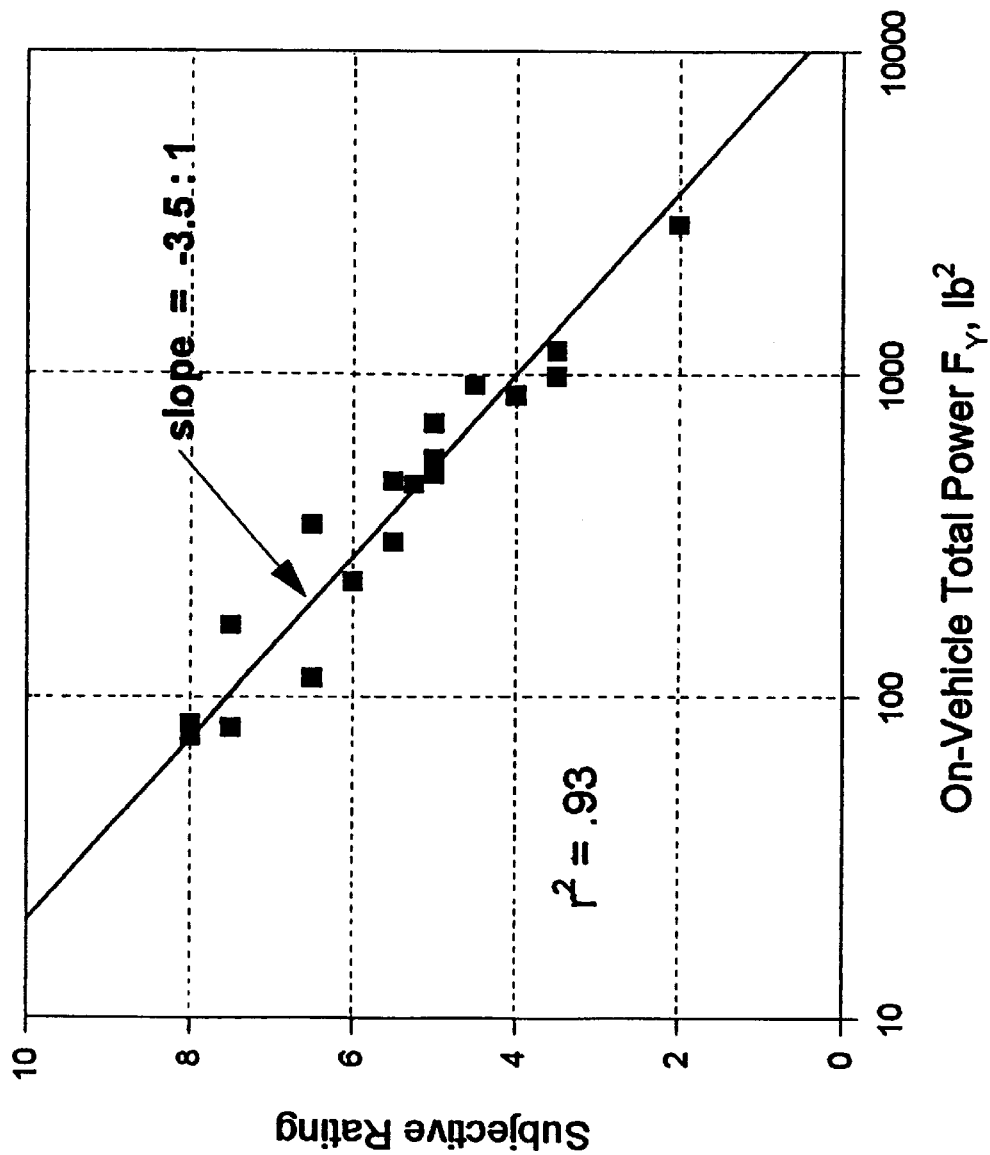
FIG. 8A is a graph illustrating the correlation between the subjective field rating and the processed objective field measurements of a set of tires tested on a first vehicle.
Figure 8B:
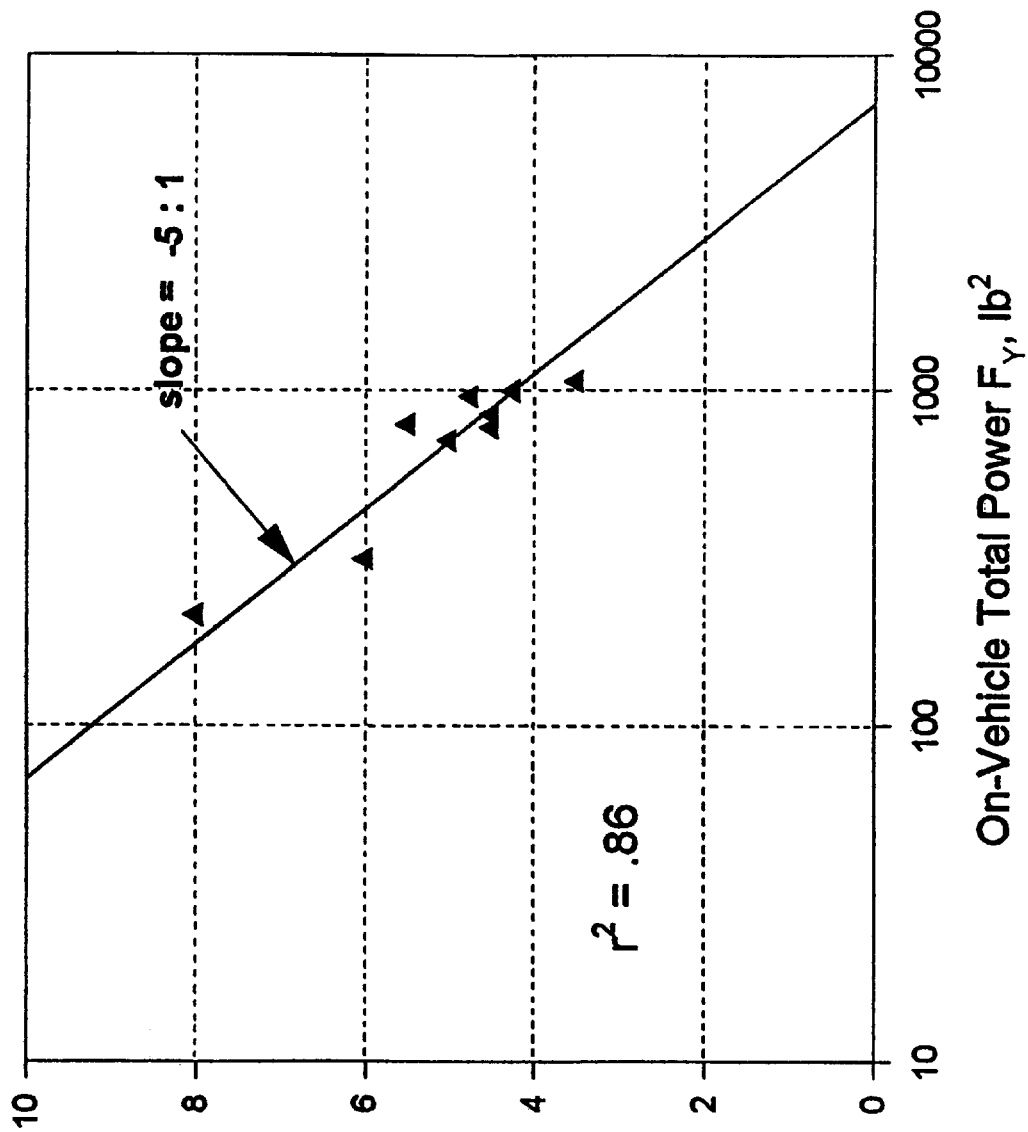
FIG. 8B is a graph illustrating the correlation between the subjective field rating and the processed objective field measurements of a set of tires tested on a second vehicle.

FIG. 8A illustrates the correlation between the subjective field test data (on a 1 to 10 point scale) and the processed objective field test data that was collected concurrently with the subjective data, which is the square of the lateral forces exerted on the tires 12 (on-vehicle total power Fy). FIG. 8B also illustrates the same type of correlation for a different vehicle (effectively a variation in radial loading) and the differing slopes of the curves in FIGS. 8A and 8B represent the different vehicle sensitivities. As highlighted earlier, smaller cars (which result in lower radial loading) generally feel the influence of rain groove wander more acutely than heavier vehicles. Therefore, it is not surprising that the subjective field test data will be a function of the type of vehicle used to test the tires. Note that the measured total power is linearly related to the subjective rating of the tires. The symbol $r^2$ is a statistical symbol which represents a coefficient of determination; it is a measure of the closeness of fit of a scatter graph to its regression line ($r^2=1$ is a perfect fit).

Figure 9A:
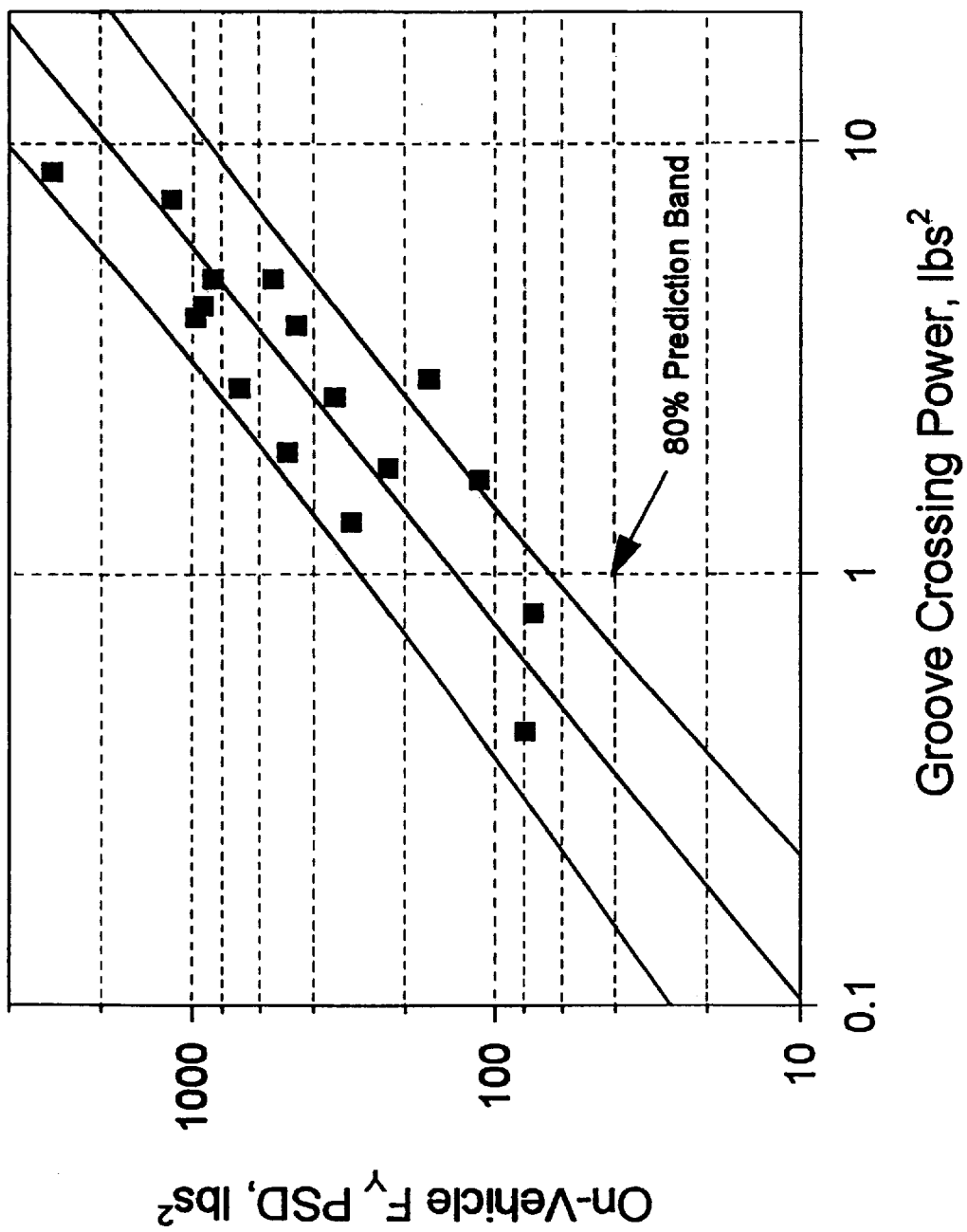
FIG. 9A is a graph illustrating a correlation between the objective field analysis data and the groove crossing power of the first vehicle.
Figure 9B:
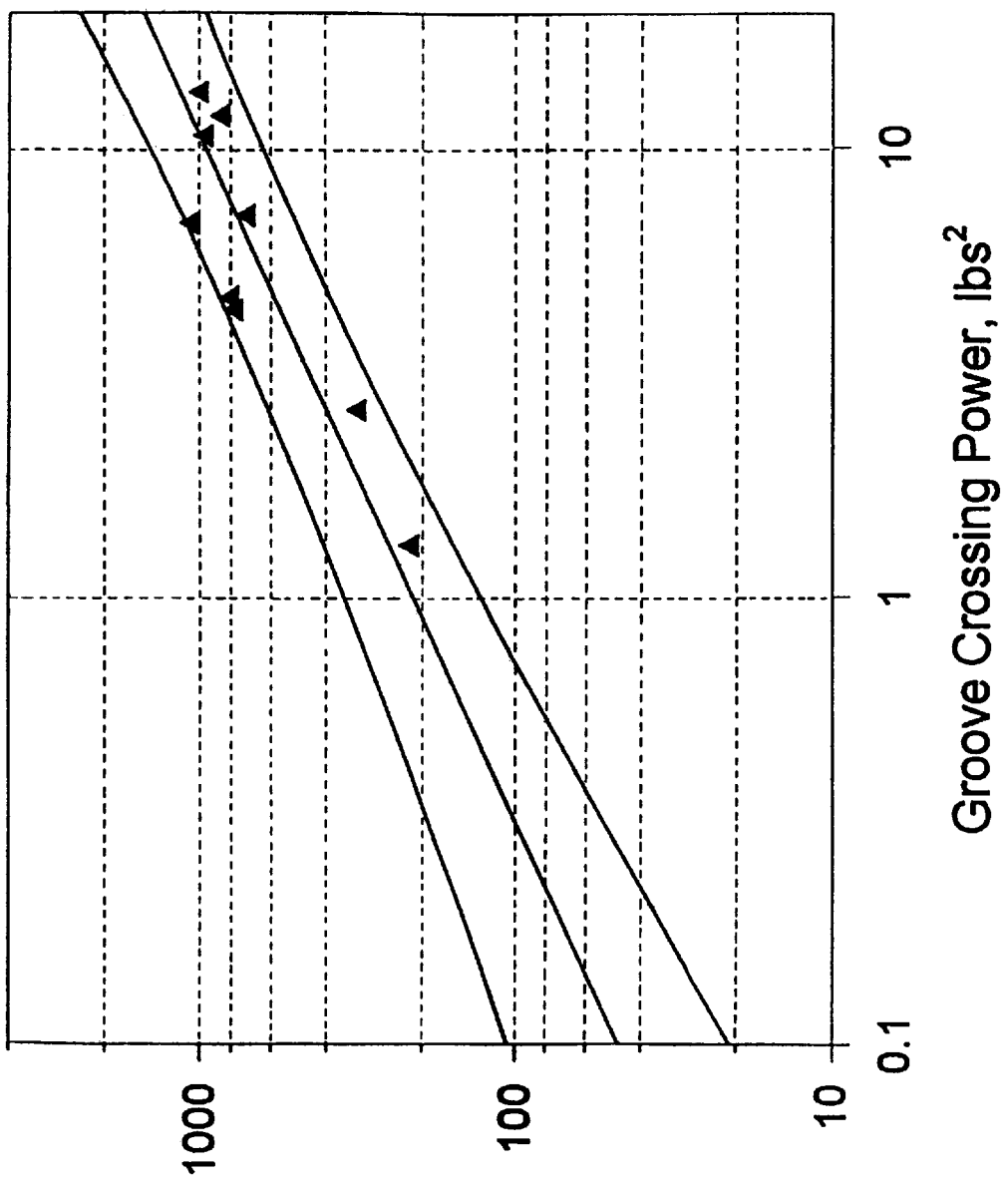
FIG. 9B is a graph illustrating the correlation between the objective field measurement data with the groove crossing power of the second vehicle.

FIGS. 9A and 9B are graphs which illustrate the correlation between the processed objective field test data and the processed objective lab test data. Both graphs utilize the Fourier coefficient extraction processing technique of FIGS. 6A, 6B and 7 to establish the correlation. The correlation, although not exact, provides an 80% confidence prediction capability (as illustrated by the 80% prediction bands in FIGS. 9A and 9B) which, in this particular embodiment, is a sufficiently close correlation for the subjective tire performance prediction. An 80% prediction confidence correlates to a ±1 subjective rating point prediction which will be explained in greater detail with respect to FIGS. 10A–10C. Therefore, by performing objective lab testing of a prototype tire, one may predict the subjective field performance characteristics of the tire within ±1 subjective rating point without performing subsequent field testing.

Sources of correlation error are at least the following. The tire angle of attack on the simulated test set 10 is different than in the field, which means that the grooves on the simulated test set 10 are straight, while the grooves will vary on an actual roadway. Another source of correlation error is due to the translation control of the module 22 not exactly simulating the actual driving conditions in that the translation frequency in the test set 10 was low and the slip angle was fixed. Additionally, the drum 14 is curved and the collar 16 (in this embodiment) is made of aluminum which alters the tire footprint dynamics with respect to the actual rain groove roadway conditions. Also, the grooves on the collar 16 are machined on the lab test set 10 which results in square edges with precise spacings while the actual roadway grooves are more rounded and spaced with less precision due to use and wear. Lastly, the precision of the load cell which measures the forces exerted on the tire in both the field and lab measurements also impact the correlation certainty. These and other factors contribute to the correlation error illustrated in FIGS. 9A and 9B, however, if needed, one may modify the lab test set 10 to more accurately simulate the actual rain groove roadway conditions such as making the drum larger, thereby more closely simulating a flat roadway, increasing the translation frequency and using more sophisticated force collection equipment and modifying the groove arrangement on the collar 16 to obtain a higher correlation prediction certainty. These types of modifications are contemplated by the present invention. In this particular embodiment, however, an 80% prediction certainty was sufficient.

Figure 10A:
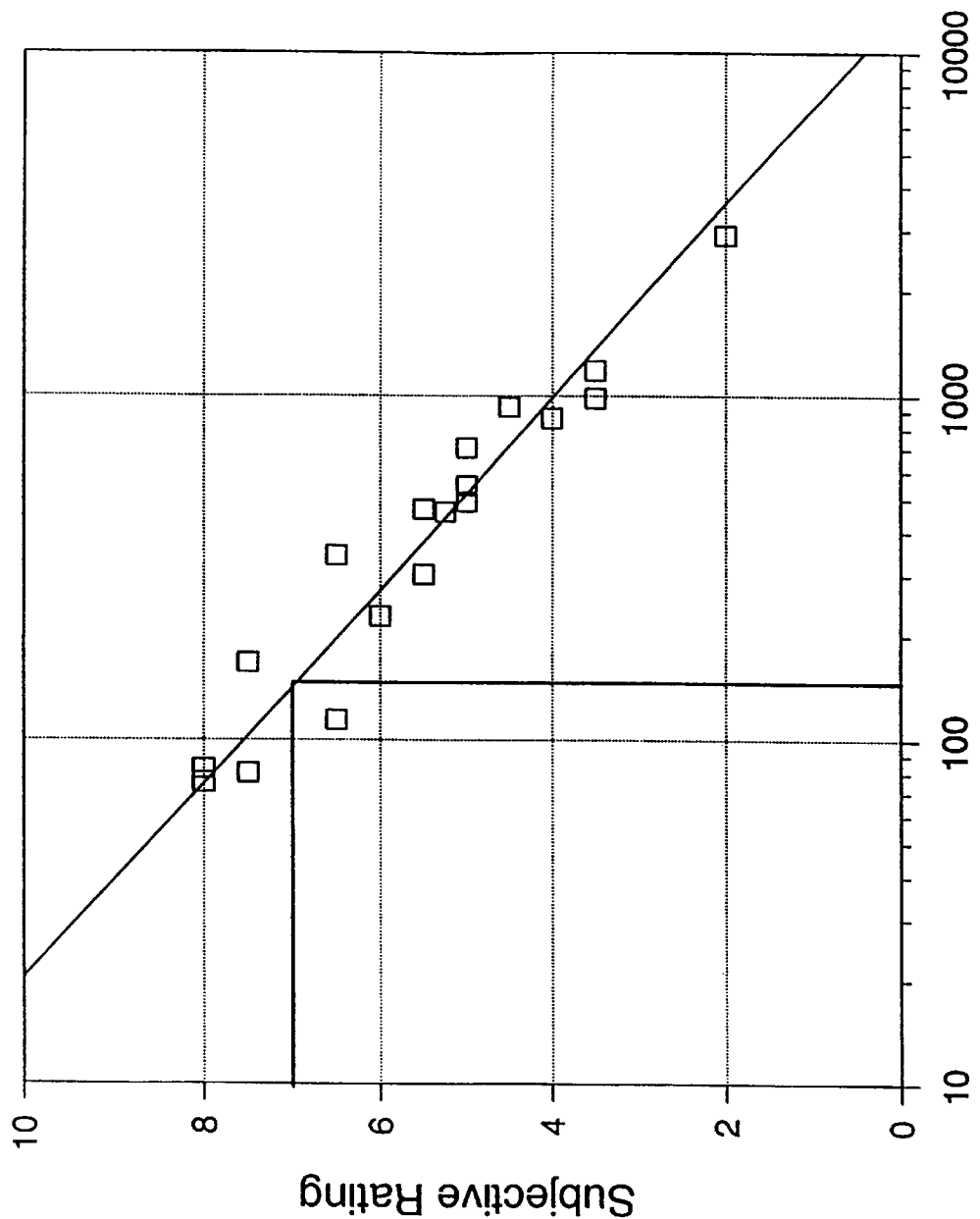
Figure 10B:
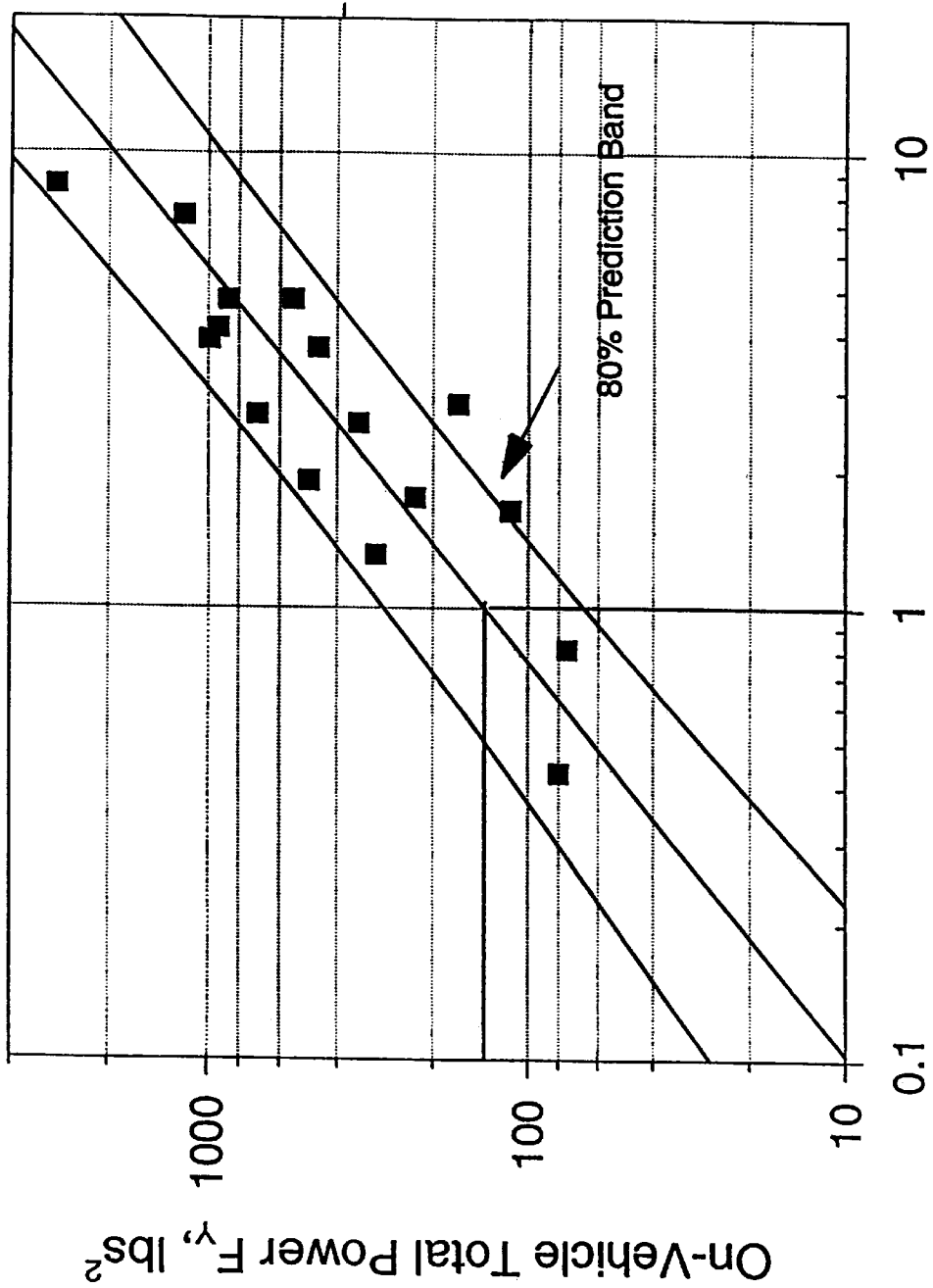

FIGS. 10A–10C are graphs which illustrate how objective lab test data is used to predict the subjective field performance of a particular tire. FIG. 10A illustrates the correlation between the subjective field rating and the processed objective field data. Therefore, as illustrated, if one wishes to have a tire performance rating of about 7.0, one must obtain a total power (Fy) during the objective field testing of about 150 lbs.$^2$ Then, one may place the prototype tire on the test set 10, measure the forces and process it as data to obtain the groove crossing power (or alternatively use another processing methodology which provides sufficiently close correlation) at a particular radial loading (which matches the radial loading exerted by the vehicle in the field testing). As illustrated in FIG. 10B, the groove crossing power needs to be 1.0 lbs.$^2$ (within 80% certainty). As illustrated in FIG. 10C, when placing the 80% prediction bands onto the subjective/objective field correlation graph, the 80% correlation certainty results in a ±1 rating point certainty. Therefore, if the prototype tire obtains a 1.0 lbs.$^2$ groove crossing power, one may accurately predict that the subjective performance of the tire on rain groove roadways will be between 6.0 and 8.0.

Although the invention has been shown and described with respect to a certain preferred embodiment or embodiments, it is obvious that equivalent alterations and modifications will occur to others skilled in the art upon the reading and understanding of the specification and the annexed drawings. In particular regard to the various functions performed by the above-described integers (components, assemblies, devices, compositions, etc.), the terms (including a reference to any "means") used to describe such integers are intended to correspond, unless otherwise indicated, to any integer which performs the specified function of the described integer (i.e., that is functionally equivalent), even though not structurally equivalent to the disclosed structure which performs the function in the herein illustration exemplary embodiment or embodiments of the invention. In addition, while a particular feature of the invention may have been described above with respect to only one of several illustrated embodiments, such feature may be combined with one or more other features of the other embodiments if may be desired and advantageous for any given or particular application.

What is claimed is:

1. A method of testing a tire for rain groove wander, comprising the steps of:

simulating rain groove road conditions on calibrated equipment;

measuring one or more forces acting on the tire which is operating in the simulated road conditions;

identifying a correlation between the measured forces and subjective tire performance data collected from a field testing of one or more other tires; and predicting a subjective tire performance of the tire based on the correlation, thereby effectively gauging the subjective performance of the tire on rain groove roadways without having to perform field testing.

2. The method of claim 1, wherein the step of simulating the rain groove road conditions comprises the steps of:

placing the tire in rotatable contact with a grooved surface; and moving the grooved surface such that the tire rotates and remains in contact with the grooved surface, thereby simulating the tire traveling on a rain groove roadway.

3. The method of claim 2, wherein the grooved surface is a cylindrical drum having a grooved circumferential surface and wherein the step of moving the grooved surface comprises rotating the drum.

4. The method of claim 2, further comprising the step of applying a variable radial loading on the tire, thereby simulating the tire performance when used by various vehicle types.

5. The method of claim 2, further comprising the step of translating the tire axially across the moving grooved surface, thereby simulating a lateral vehicle movement on the rain groove roadway.

6. The method of claim 1, wherein the step of measuring the one or more forces acting on the tire comprises measuring a lateral force.

7. The method of claim 1, wherein the step of identifying a correlation comprises processing data corresponding to the one or more measured forces to place the processed data in a format so that the formatted data correlates substantially closely with the subjective tire performance.

8. A method of testing a tire for rain groove wander, comprising the steps of:

simulating rain groove road conditions;

measuring one or more forces acting on the tire which is operating in the simulated road conditions;

identifying a correlation between the measured forces and subjective tire performance data collected from a field testing of one or more other tires; and predicting a subjective tire performance of the tire based on the correlation, thereby effectively gauging the subjective performance of the tire on rain groove roadways without having to perform field testing;

wherein the step of identifying a correlation comprises processing data corresponding to the one or more measured forces to place the processed data in a format so that the formatted data correlates substantially closely with the subjective tire performance;

wherein the step of processing the data comprises the steps of:

time filtering the data, wherein the data within each of a plurality of prescribed time periods are averaged;

compressing the data such that each piece of data associated with a lateral position of the tire with respect to a groove on the grooved surface is graphically overlaid;

normalizing the compressed data with respect to a mean lateral force across the grooved surface; and calculating a peak-to-peak force difference of the normalized data for use in correlating the measured forces to the subjective tire performance data.

9. A method of testing a tire for rain groove wander, comprising the steps of:

simulating rain groove road conditions;

measuring one or more forces acting on the tire which is operating in the simulated road conditions;

identifying a correlation between the measured forces and subjective tire performance data collected from a field testing of one or more other tires; and predicting a subjective tire performance of the tire based on the correlation, thereby effectively gauging the subjective performance of the tire on rain groove roadways without having to perform field testing;

wherein the step of identifying a correlation comprises processing data corresponding to the one or more measured forces to place the processed data in a format so that the formatted data correlates substantially closely with the subjective tire performance;

wherein the step of processing the data comprises the steps of:

time filtering the data, wherein the data within each of a plurality of time periods are averaged;

compressing the data such that each piece of data associated with a lateral position of the tire with respect to a groove on a grooved surface is graphically overlaid;

normalizing the compressed data with respect to a mean lateral force across the grooved surface;

extracting a predetermined number of Fourier coefficients from the normalized compressed data; and summing the squares of the predetermined number of Fourier coefficients for use in correlating the measured forces to the subjective tire performance data.

10. A method for correlating a subjective analysis of rain groove wander for tires to an objective analysis technique that does not require vehicle testing, comprising the steps of:

collecting subjective field measurements of rain groove wander for a particular tire;

collecting objective field measurements of forces acting on the tire concurrently with the collecting of the subjective field measurements;

correlating the subjective and objective field measurements;

objective lab measurements of forces acting on the tire under simulated driving conditions; and identifying a correlation between the objective field measurements and the objective lab measurements, thereby effectively correlating the objective lab measurements to the subjective field measurements.

11. The method of claim 10, wherein the step of collecting subjective field measurements comprises the steps of:

driving a vehicle having a set of tires for evaluation on a rain groove roadway; and providing a subjective rating during the driving, wherein the subjective rating reflects a composite handling and rideability characteristic of the vehicle sensed by a driver on the rain groove roadway.

12. The method of claim 10, wherein the step of collecting objective field measurements comprises the steps of:

driving a vehicle having a set of tires for evaluation on a rain groove roadway; and measuring one or more forces exerted by the rain groove roadway on the tires.

13. The method of claim 10, wherein the step of collecting objective lab measurements of forces acting on the tire under simulated driving conditions comprises the steps of:

simulating rain groove road conditions; and measuring one or more forces acting on a tire which is operating in the simulated road conditions.

14. The method of claim 13, wherein the step of simulating the rain groove road conditions comprises the steps of:

placing the tire in rotatable contact with a grooved surface; and moving the grooved surface such that the tire rotates and remains in contact with the grooved surface, thereby simulating the tire traveling on a rain groove roadway.

15. The method of claim 14, wherein the grooved surface is a cylindrical drum having a grooved circumferential surface and wherein the step of moving the grooved surface comprises rotating the drum.

16. The method of claim 14, further comprising the step of applying a variable radial loading on the tire, thereby simulating the tire performance when used by various vehicle types.

17. The method of claim 14, further comprising the step of translating the tire axially across the moving grooved surface, thereby simulating a lateral vehicle movement on the rain groove roadway.

18. The method of claim 10, wherein the objective lab measurements comprise data and wherein identifying a correlation between the objective field measurements and the objective lab measurements further comprises processing the data to place the processed data in a format that correlates substantially closely with the objective field measurements.

19. A method of selecting a desired tire based on a subjective rain groove roadway characteristic without performing subjective tire evaluations, comprising the steps of:

selecting a desired subjective rain groove roadway tire performance;

identifying an objective force value that correlates with the desired subjective rain groove roadway tire performance;

identifying a required simulated force characteristic based on the identified objective force;

simulating one or more tires; and selecting a tire that meets the required simulated force characteristic, thereby selecting a tire having the desired subjective rain groove roadway performance.

20. The method of claim 1, wherein the step of identifying a correlation comprises calculating a peak-to-peak force difference for use in correlating the measured forces to the subjective tire performance data.

21. The method of claim 1, wherein the step of identifying a correlation comprises extracting Fourier coefficients for use in correlating the measured forces to the subjective tire performance data.

* * * * *